United States Patent
Yanai et al.

(10) Patent No.: US 8,233,080 B2
(45) Date of Patent: Jul. 31, 2012

(54) ELECTRONIC FLASH APPARATUS ADJUSTING A LIGHT DISTRIBUTION FIELD ANGLE AND CAMERA PROVIDED WITH THE SAME

(75) Inventors: Junichi Yanai, Chigasaki (JP); Hideki Matsui, Fujisawa (JP)

(73) Assignee: Nikon Corporation, Tokyo (JP)

( * ) Notice: Subject to any disclaimer, the term of this patent is extended or adjusted under 35 U.S.C. 154(b) by 328 days.

(21) Appl. No.: 12/453,663

(22) Filed: May 18, 2009

(65) Prior Publication Data

US 2009/0284647 A1  Nov. 19, 2009

(30) Foreign Application Priority Data

May 19, 2008  (JP) ................... 2008-131000
Apr. 27, 2009  (JP) ................... 2009-107237

(51) Int. Cl.
*H04N 5/262* (2006.01)
*H04N 5/222* (2006.01)

(52) U.S. Cl. .................. 348/371; 348/240.99

(58) Field of Classification Search .......... 348/370, 348/371, 240.99–240.3; 396/164, 175
See application file for complete search history.

(56) References Cited

U.S. PATENT DOCUMENTS

| | | | |
|---|---|---|---|
| 6,826,364 B2 * | 11/2004 | Kawasaki et al. | 396/157 |
| 7,652,274 B2 * | 1/2010 | Wernersson | 250/552 |
| 7,920,205 B2 * | 4/2011 | Awazu | 348/371 |
| 2004/0119878 A1 * | 6/2004 | Okamura | 348/371 |
| 2005/0219405 A1 * | 10/2005 | Ichihara | 348/370 |
| 2008/0193119 A1 * | 8/2008 | Miyazaki | 396/157 |

FOREIGN PATENT DOCUMENTS

| | | |
|---|---|---|
| JP | B2-2967963 | 10/1999 |
| JP | A-2000-206598 | 7/2000 |
| WO | WO 2006129777 A1 * | 12/2006 |

* cited by examiner

*Primary Examiner* — Timothy J Henn
(74) *Attorney, Agent, or Firm* — Oliff & Berridge, PLC (57) ABSTRACT

To provide a flash apparatus and a camera provided with the same which can carry out more appropriate adjustment of the light distribution field angle. An electronic flash apparatus with a variable light distribution field angle wherein the light distribution field angle is determined according to a focal length of a photographic lens and a photographic region on an imaging area, comprising a plurality of light distribution field angles corresponding to one combination of one of the focal length and one of the photographic region, and one light distribution field angle is selectable from among the plurality of light distribution field angles.

14 Claims, 10 Drawing Sheets

ELECTRONIC FLASH APPARATUS ADJUSTING A LIGHT DISTRIBUTION FIELD ANGLE AND CAMERA PROVIDED WITH THE SAME

The present application claims priority under 35 U.S.C. §119 to Japanese Patent Application No. 2008-131000 filed on May 19, 2008, and Japanese Patent Application No. 2009-107237 filed on Apr. 27, 2009. The content of these applications are incorporated herein by reference in its entirety.

BACKGROUND OF THE INVENTION

1. Field of the Invention

The present invention relates to an electronic flash apparatus and a camera provided with the same.

2. Description of the Related Art

Hitherto, there has been an electronic flash apparatus which can automatically change its illumination angle in accordance with the focal length of the photographic lens (for example, Japanese Unexamined Patent Publication No. 2000-206598). Further, a camera is known which can automatically change the illumination angle in consideration of not only the focal length of the photographic lens, but also the aspect ratio for the extent of trimming at the time of printing (for example, Japanese Patent No. 2967963).

SUMMARY OF THE INVENTION

However, in a digital camera, the latitude of the image sensor is narrow compared to film. Because of this, there is the problem that compared to a film camera, the effect of illumination falloff at the periphery of a picture can be notably more apparent. In order to make it more difficult for the effect of illumination falloff to appear, the photographer may intentionally manually adjust the light distribution field angle of the electronic flash apparatus to exceed the photographic field angle. Specifically, for example, when the focal length of the photographic lens is 35 mm, the corresponding field angle of the electronic flash apparatus is set to 28 mm and the light distribution field angle is broadened, and the peripheral illumination falloff of the photographed image is prevented. However, for the manual adjustment of the light distribution field angle of the electronic flash apparatus, it is difficult for someone not skilled in the operation of the electronic flash apparatus to judge to what extent the light distribution field angle of the flash apparatus should be adjusted.

Further, even if the illumination angle is automatically changed according to the focal length of the photographic lens, the appropriate range of the illumination angle may differ depending on the photographic scene.

The problem addressed by the present invention it to provide a flash apparatus and a camera provided with the same, which can carry out more appropriate adjustment of the light distribution field angle.

Means to Solve the Problem

The present invention solves the above problem by the following means.

In order to achieve the object mentioned above, according to the first aspect of the present invention, there is provided an electronic flash apparatus with a variable light distribution field angle wherein the light distribution field angle is determined according to a focal length of a photographic lens and a photographic region on an imaging area, comprising a plurality of light distribution field angles corresponding to one combination of one of the focal length and one of the photographic region, and one light distribution field angle is selectable from among the plurality of light distribution field angles.

When one photographic mode among a plurality of photographic modes provided on a camera is selected, one light distribution field angle may be automatically selected from among the plurality of light distribution field angles according to the selected photographic mode.

When one photometric mode among a plurality of photometric modes provided on a camera is selected, one light distribution field angle may be automatically selected from among the plurality of light distribution field angles according to the selected photometric mode.

When one distance measuring mode among a plurality of distance measuring modes provided on a camera is selected, one light distribution field angle may be automatically selected from among the plurality of light distribution field angles according to the selected distance measuring mode.

One light distribution field angle may be automatically selected from among the plurality of light distribution field angles according to conditions of an area inside the field angle which an object occupies.

The selection of the light intensity distribution may be automatically carried out according to a photographic scene photographed by the camera.

The selection of the light intensity distribution may be carried out based on face recognition which detects a human face in an object image in the photographic scene.

The face recognition comprises recognition of a position, number and size of the face of the object, and the selection of the light distribution field angle may be based on at least one of these.

A selection of the light distribution field angle may be made with reference to a state of reflected light of a preliminary illumination carried out for an object in a photographic scene.

The light distribution field angle may be one light distribution field angle automatically selected from among the plurality of light distribution field angles in accordance with a type of camera on which the electronic flash apparatus is mounted.

The light distribution field angle may be one light distribution field angle selectable from among three or more light distribution field angles.

A display portion distinguishably displaying a selected light distribution state may be provided.

According to the second aspect of the present invention, there is provided an electronic flash apparatus comprising: a flash apparatus main body, a light emitting body which emits a flash, and a driving mechanism which moves the light emitting body in an optical axis direction of the flash in an inner portion of the flash apparatus main body according to a focal length of a photographic lens and a photographic range on a imaging area, and wherein a plurality of alternatively selectable positions of the light emitting body are provided as positions corresponding to one combination of the one focal length and the one photographic range in the inner portion of the flash apparatus main body, and one position is selectable from among this plurality of positions.

According to the third aspect of the present invention, there is provided a camera provided with the electronic flash apparatus according to the aforementioned electric flash apparatus.

According to the present invention, it is possible to provide a flash apparatus and a camera provided with the same which can carry out more appropriate adjustment of the light distribution field angle.

DETAILED DESCRIPTION OF THE PREFERRED EMBODIMENTS

First Embodiment

Figure 1:
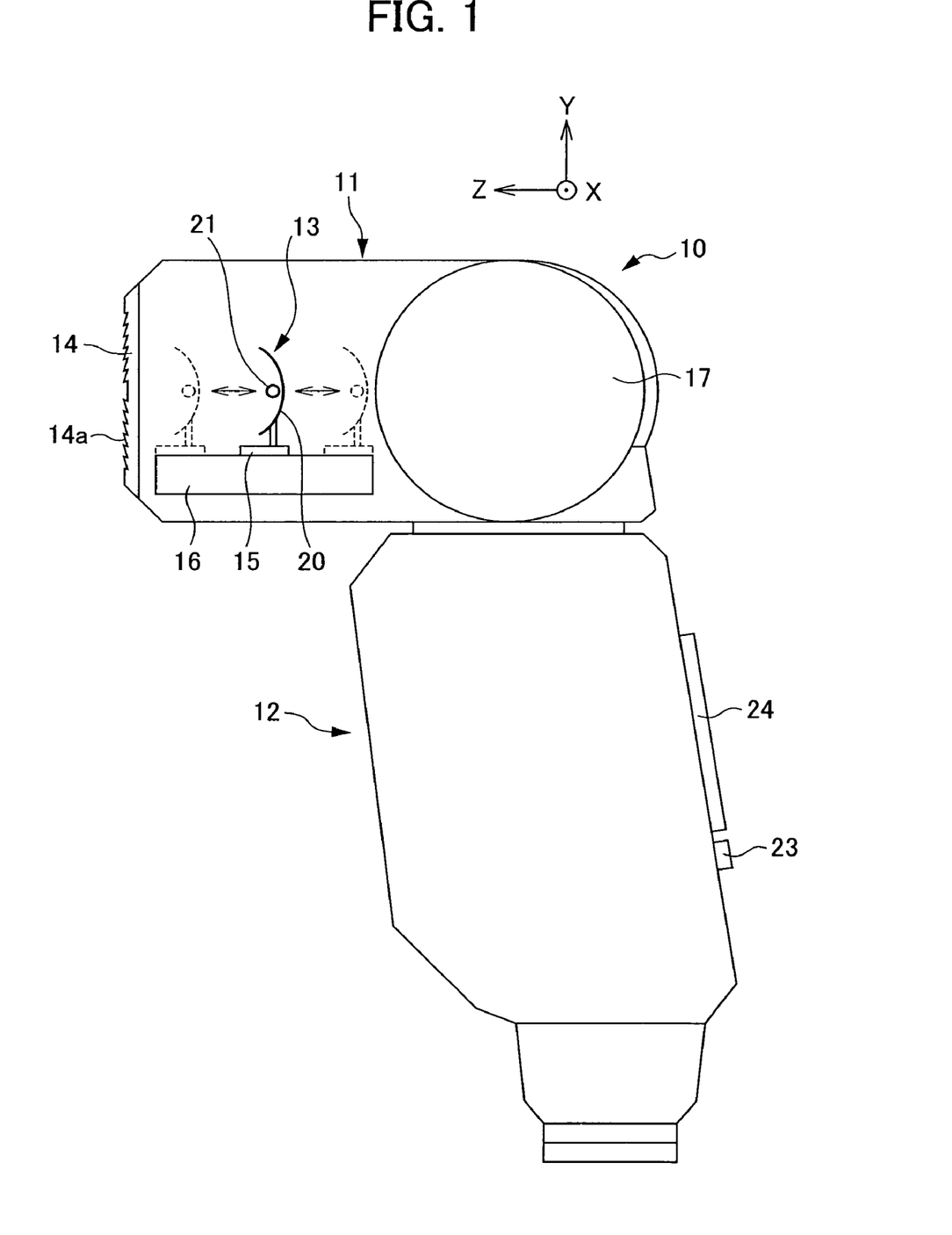
FIG. 1 is a schematic diagram of the flash apparatus of the first embodiment of the present invention.

Below, the first embodiment of the present invention is explained with reference to drawings and the like. FIG. 1 is a schematic diagram of the flash apparatus 10. The flash apparatus 10 in the present embodiment is a flash apparatus which is mounted on a digital camera 30 (shown in FIG. 2) provided with an imaging sensor, but the present invention is not limited to this, and may also be a flash apparatus built into a camera. Further, this flash apparatus 10 can be mounted and used not only on a digital camera 30, but also on a film camera. Further, in the following drawings, the light emission direction (optical axis direction) of the flash apparatus 10 is the Z positive direction, the direction facing upwards when the flash apparatus 10 is mounted on the camera 30 held in the proper position is the Y positive direction, and the X direction is set as the direction perpendicular to the Z axis and the Y axis.

As shown in FIG. 1, the flash apparatus 10 is provided with a flash portion 11 and a control section 12. The flash portion 11 is provided with the light emitting portion 13 which emits the flash, Fresnel lens 14 which is provided in front of the light emitting portion 13, the holding stand 15 which holds the light emitting portion 13, the linear motion mechanism 16 which makes the light emitting portion 13 and the holding stand 15 move along the Z axis, and the condenser 17 which provides the electric power for the light emission to the light emitting portion 13.

The light emitting portion 13 is provided with the reflector 20 which is positioned such that its longitudinal direction lies along the X axis, and the xenon tube 21 positioned at the inner portion of the reflector 20 such that its longitudinal direction lies along the X axis, in the same way as for the reflector 20.

The reflector 20 is a reflecting portion which reflects the flash of the xenon tube 21 in the Z positive direction, and is a member formed by bending a planar member is bent such that a rectangular opening portion is formed in the Z positive direction. The reflector 20, in order to resist the heat emission of the xenon tube 21, is a heat resistant member, for example made of a metal such as aluminum, and is manufactured by press forming this metal sheet or the like.

The xenon tube 21 is a long cylindrical member with its longitudinal direction extending along the x axis. The xenon tube 21 is a xenon discharge light emission tube which emits light by a discharge of electricity of the condenser 17, and at the time of discharge, a voltage of several hundred V or more is applied.

The Fresnel lens 14 is provided with a plurality of concentric circular Fresnel grooves 14a at a face on the opposite side of the light emitting portion 13 (the Z positive side face which is the radiation side of the flash).

The linear motion mechanism 16 is a mechanism which moves the holding stand 15 on which the light emitting portion 13 is held in the Z axis direction. The linear motion mechanism 16, by changing the distance in the Z axis direction between the Fresnel lens 14 and the light emission portion 13, changes the illumination angle of the flash, and is driven by a motor or the like.

Figure 2:
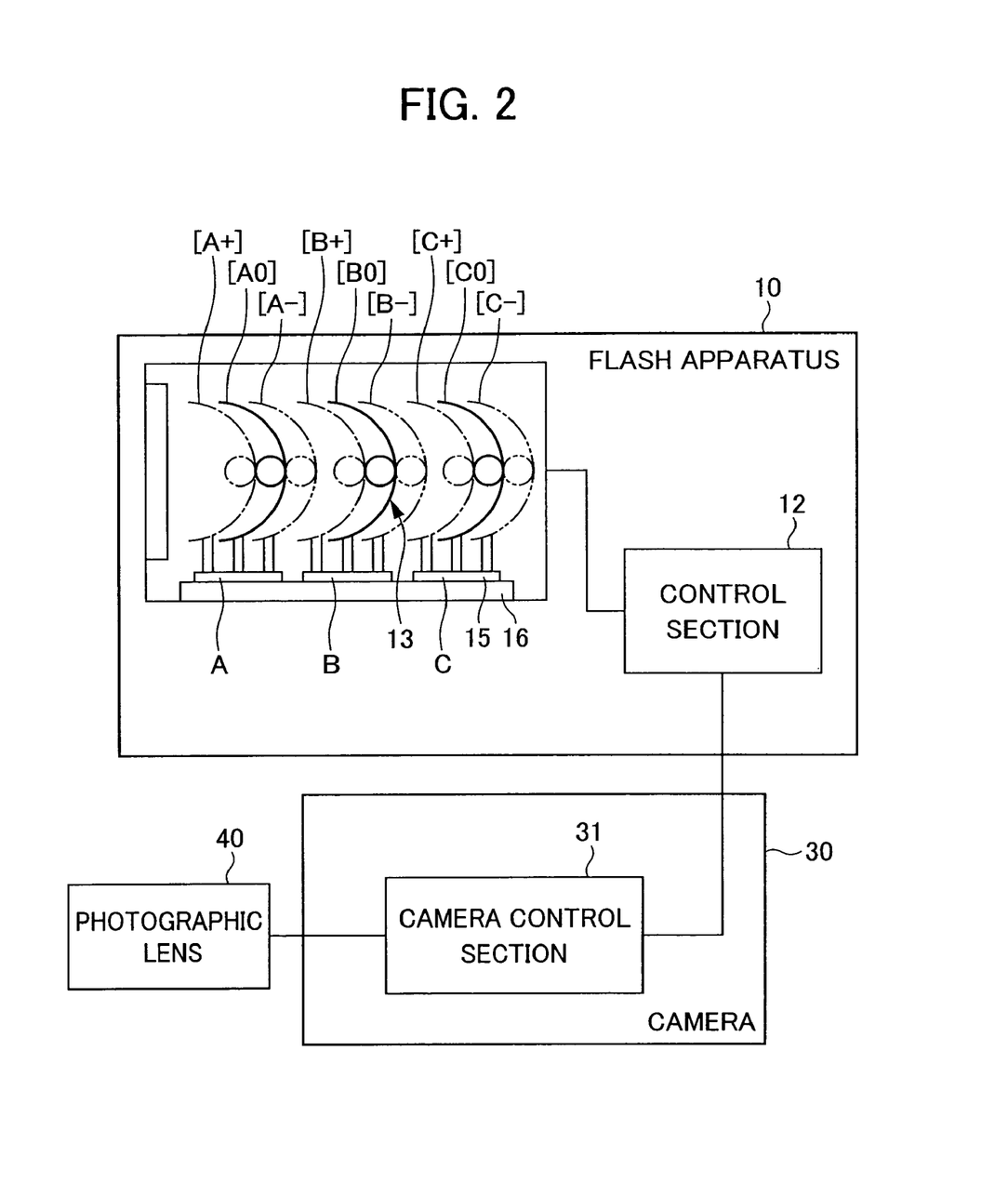
FIG. 2 is a block diagram showing a flash apparatus, camera, and photographic lens mounted on the camera.

FIG. 2 is a block diagram showing the flash apparatus 10, camera 30, and the photographic lens 40 mounted on the camera 30. This camera 30 (digital camera) is provided with a full size imaging sensor, and the imaging area on the imaging face of this imaging sensor can be switched (selected) to image areas (DX size 23.6×15.8 mm; 5:4 Aspect Ratio size 30×24 mm) other than full size (24×36 mm) by a cropping process. When the flash apparatus 10 is mounted on the camera 30, the terminals of the flash apparatus 10 and the camera 30 come into contact with each other, and it becomes possible for the control of the camera 30 and the control of the flash 10 to work together. By working together in this way, information concerning the imaging area of the imaging sensor of the camera 30 (the imaging area on the image face (also known as the aspect ratio)) is transmitted from the camera control section 31 of the camera 30 to the control section 12 of the flash apparatus 10. Further, when the photographic lens 40 is mounted on the camera 30, the terminals of the photographic lens 40 and the camera 30 come into contact with each other, and it becomes possible for the control of the photographic lens 40 and the control of the camera 30 to work together. By working together in this way, information concerning the zoom position of the photographic lens 40 is transmitted from the photographic lens 40 to the control section 31 of the camera 30, and is further transmitted to the control section 12 of the flash apparatus 10. The control section 12, in response to the transmitted zoom position (focal length) of the photographic lens 40 and imaging area information of the imaging sensor, moves the holding stand 15 on which the light emitting portion 13 is held in the Z axis direction by the linear motion mechanism 16 (it can be moved to the positions A-B-C in FIG. 2). By this movement, the light distribution field angle of the light emitting portion 13 is adjusted in response to the zoom position (focal length) of the photographic lens 40.

Figure 3:
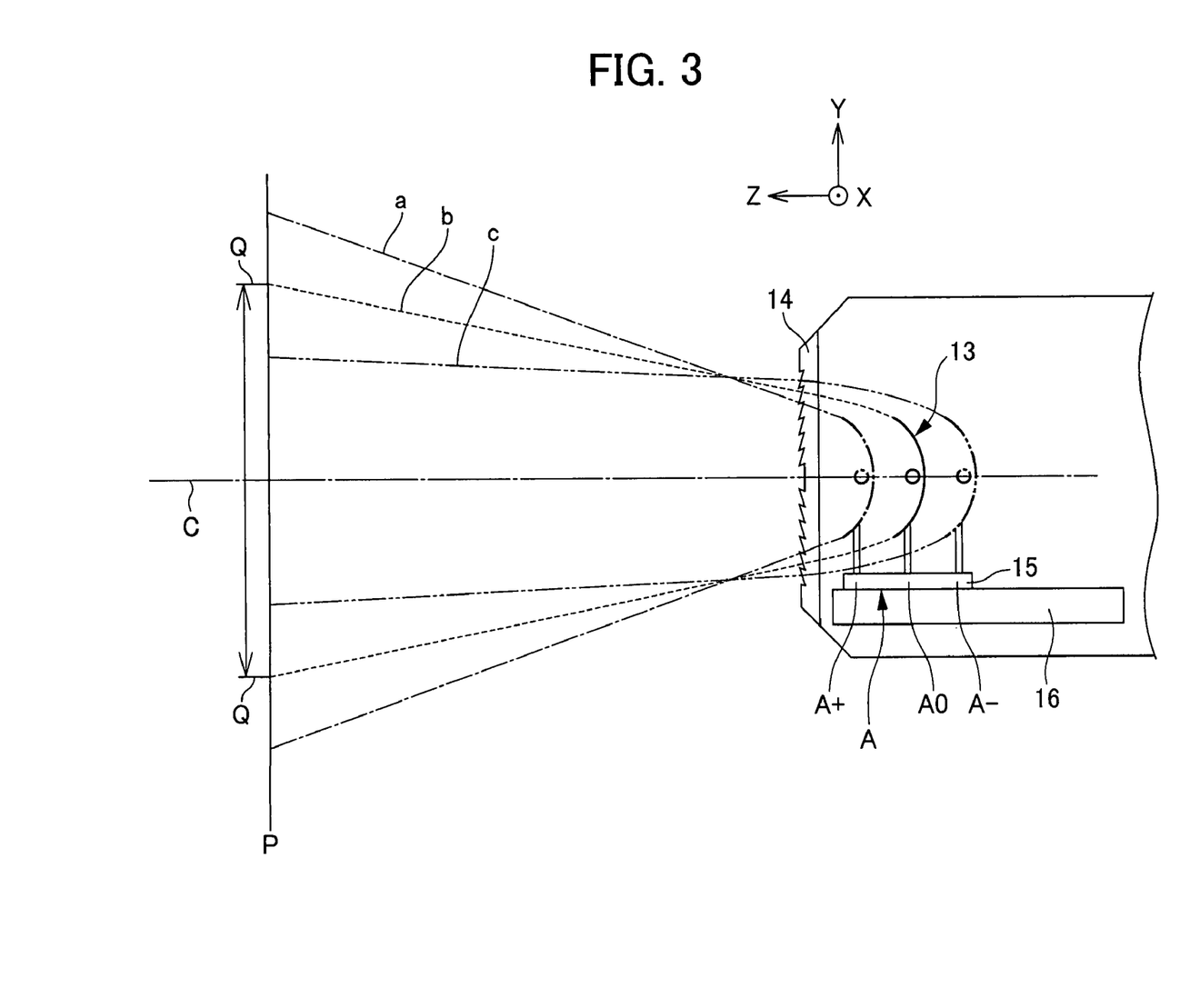
FIG. 3 is an enlarged view of the portion including the light emitting portion in the flash apparatus.

The light emitting portion 13 can further take multiple positions due to a driving mechanism such as a motor or the like, on the holding stand 15 which is moved by the linear motion mechanism 16. In the present embodiment, a driving mechanism which drives the light emitting portion 13 on the holding stand 15 is provided in the holding stand 15. FIG. 3 is an enlarged drawing of the portion including the light emitting portion 13 in the flash apparatus 10. As illustrated, the light emitting portion 13 can take any of the positions on the holding stand 15 at the position A on the linear motion mechanism 16 among the basic light distribution position A0 shown by a full line in the drawing; the wide light distribution position A+ shown by the alternate long and short dash line, where it is moved further in the Z plus direction, which is the direction further towards the Fresnel lens 14 than the basic light distribution position A0; and the narrow light distribution position A− shown by the alternate long and two short dashes line where it is moved in the Z negative direction, which is the direction further removed from the Fresnel lens 14 than the basic light distribution position A0.

As shown in FIG. 1, at the reverse face of the flash apparatus 10, an input portion (operating member) 23 and a display portion 24 such as a liquid crystal or the like are provided, and the user can freely select any position of the light emitting portion 13, from among the above described basic light distribution position A0, wide light distribution position A+, and narrow light distribution position A−, by this input portion 23. Moreover, the default position when delivering the flash apparatus 10 is the basic light distribution position A0, but once it is changed, the next time it is activated, the position to which it was changed becomes the default position. Further, when the flash apparatus 10 is in the later described manual operation (when non automatic), the position on the holding stand 15 on the linear motion mechanism 16 can be input (set) by the input portion 23.

Figure 4A:
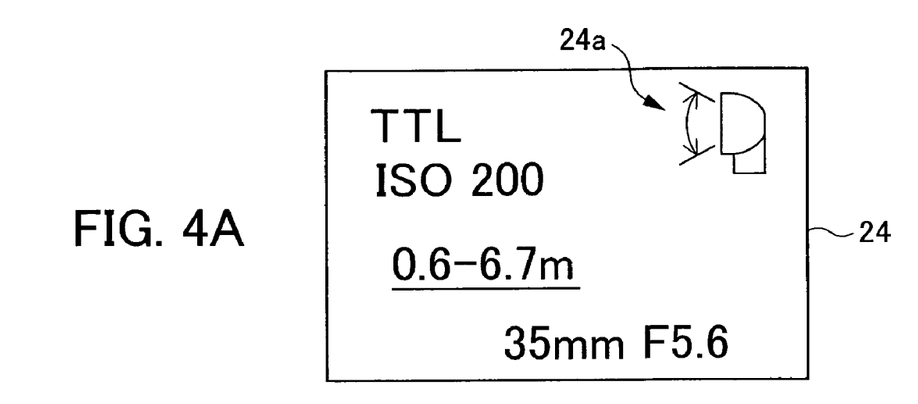
FIG. 4 is a diagram showing the display portion; 4A is for the case that a wide light distribution position is selected, and 4B is for the case that a narrow light distribution position was selected.
Figure 4B:
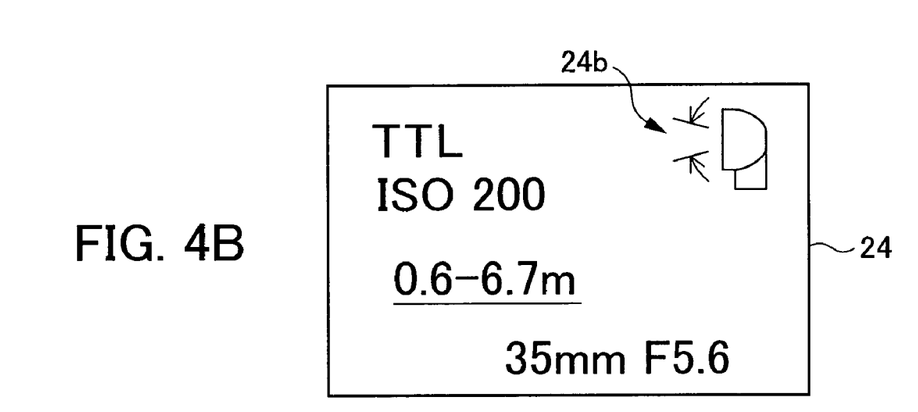
Figure 4C:
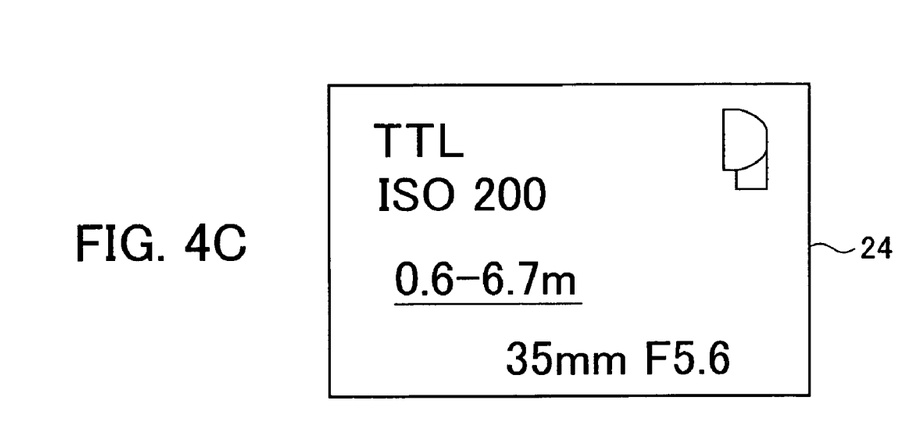

FIG. 4 is a drawing showing the display portion 24. FIG. 4A shows the case where the wide light distribution position A+ is selected, and FIG. 4B shows the case where the narrow light distribution A− is selected. As shown in FIG. 4A, when the wide light distribution position A+ is selected, the display 24a showing that the light distribution field angle has widened is light on the display portion 24. Further, as shown in FIG. 4B, when the narrow light distribution position A− is selected, the display 24b showing that the light distribution field angle has narrowed is light on the display portion 24. Further, for the case of the basic light distribution position A0, in order to avoid misunderstandings, as shown in FIG. 4C, information concerning the light distribution field angle is not displayed on the display portion 24.

FIG. 3 shows the spread of light advancing towards the object from the Fresnel lens 14 when the light emitting portion 13 is at the wide light distribution position A+, the basic light distribution position A0, and the narrow light distribution position A−, in the state where the holding stand 15 of the light emitting portion 13 is held at position A on the linear motion mechanism 16. In the figure, the light for the case that the light emitting portion 13 is in the wide light distribution position of position A+ is shown by the alternate long and short dash line, the light for the case that the light emitting portion 13 is in the basic light distribution position of position A0 is shown by the dotted line, and the light for the case that the light emitting portion 13 is in the narrow light distribution position of position A− is shown by the alternate long and two short dashes line. Moreover, the light beams shown here are lines where light having an intensity reduced by −1 EV compared to the intensity of the center (optical axis C) of the light in the Z direction.

FIG. 5 is a drawing showing the outline of the light of a −1 EV intensity at the position P of FIG. 3. The symbol Q in FIG. 3 and FIG. 5 is the contour of the photographic field angle of the camera 30. FIG. 5A is the case where the light emitting portion 13 is at the wide light emitting position A+, FIG. 5B is the case where the light emitting portion 13 is at the basic light emitting position A0, and FIG. 5C is the case where the light emitting portion 13 is at the narrow light emitting position A−. Further, FIG. 6 is a graph showing the intensity distribution at the position P, and shows the photographic field angle from the optical axis C as the abscissa, and the intensity as the ordinate.

Figure 5A:
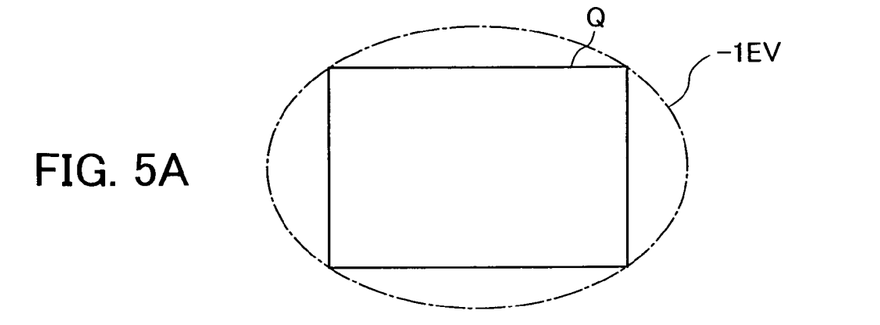
FIG. 5 is a drawing showing the outline of the light with an intensity of −1 EV at the position P of FIG. 3.
Figure 6:
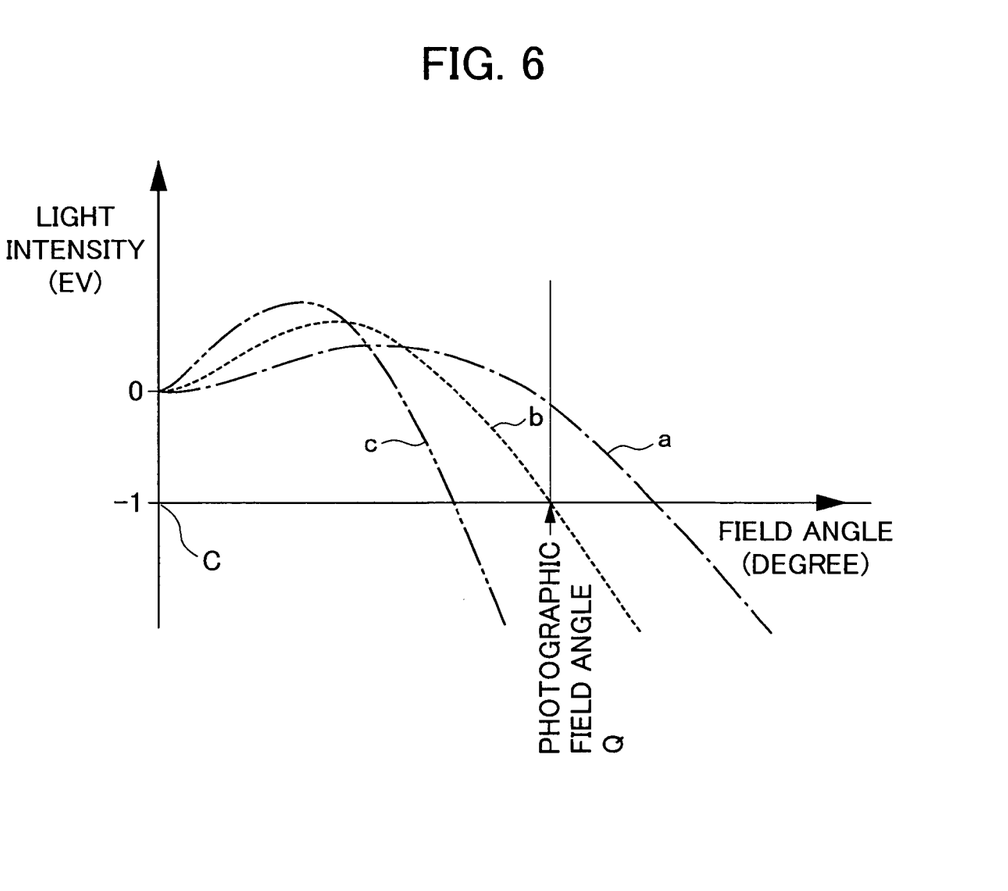
FIG. 6 is a graph showing the light intensity distribution at the position P.

As shown by the line a (alternate long and short dash line) of FIG. 3 and FIG. 6, and FIG. 5A, when selecting the wide light distribution position A+, the profile using light of −1 EV extends to the outside of the contour Q of the photographic field angle. Because of this, a brightness of −1 EV or above is assured for the entire region within the photographic field angle, and the intensity does not fall below −1 EV in the diagonal periphery of the photographed image.

Figure 5B:
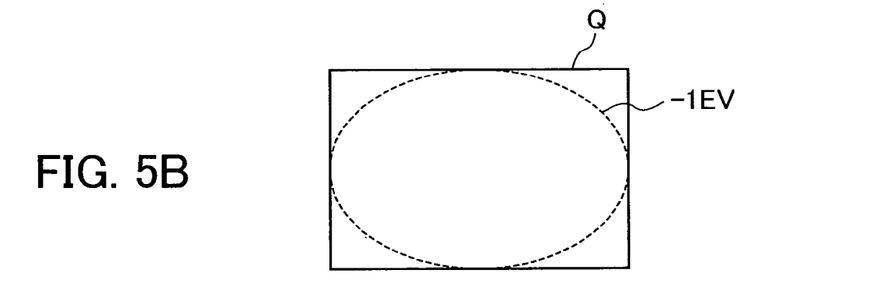

As shown by the line b (dotted line) of FIG. 3 and FIG. 6, and FIG. 5B, for the case of the basic light distribution position A0, the profile using light of −1 EV has a size which exactly falls inside the photographic field angle. For this case, there will be a portion where the intensity in the diagonal periphery of the photographed image (four corner region) falls below −1 EV. In this case, in particular because the latitude for a digital camera 30 is narrow, the periphery (four corners) of the photographic field angle will produce a photograph with somewhat dark corners.

Figure 5C:
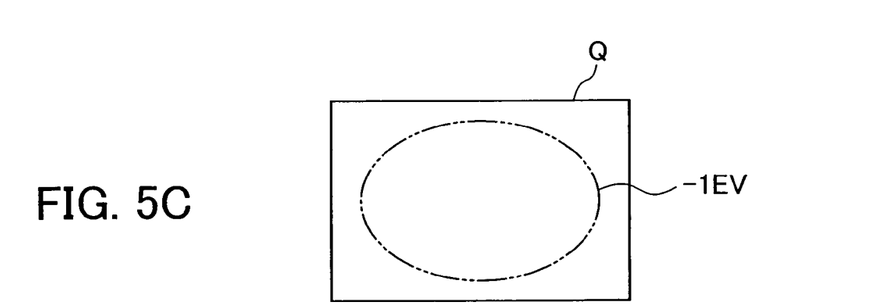
Figure 5D:
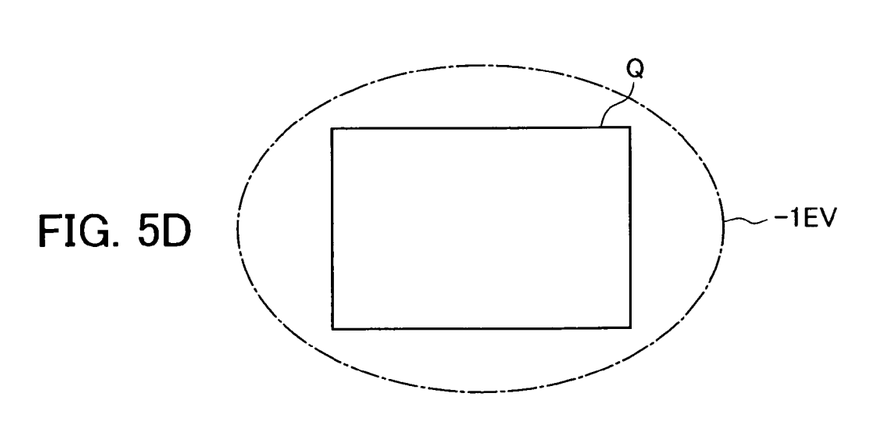

As shown by line c (alternate long and two short dashes line) of FIG. 3 and FIG. 6, and FIG. 5C, the profile of the light of −1 EV for the case of the narrow light distribution position A− is further towards the inside than the borders of the photographic field angle. In this case, the entire region of the peripheral portion of the photographed image will have a portion where the intensity drops below −1 EV over a prescribed area. For this case, the surroundings become darker than for the case of the basic light distribution position, but this is suitable for photographic scenes and the like where only the central area of a photographed picture is desired to be particularly bright. Further, it is possible to implement a higher guide number. Furthermore, by reducing the peripheral light intensity, because the appearance is more three-dimensional, this is favorable for cases where a photographed image is desired to be more three dimensional, such as a portrait or the like.

Next, the operation of the flash apparatus 10 of FIG. 1 will be explained. First, the flash apparatus 10 is mounted on the camera 30, and when the switch on the flash apparatus 10 is set to "ON", charging of the condenser 17 starts by a signal from the control section 12, along with the display of the menu screen on the display portion 24 of the back face.

Figure 7:
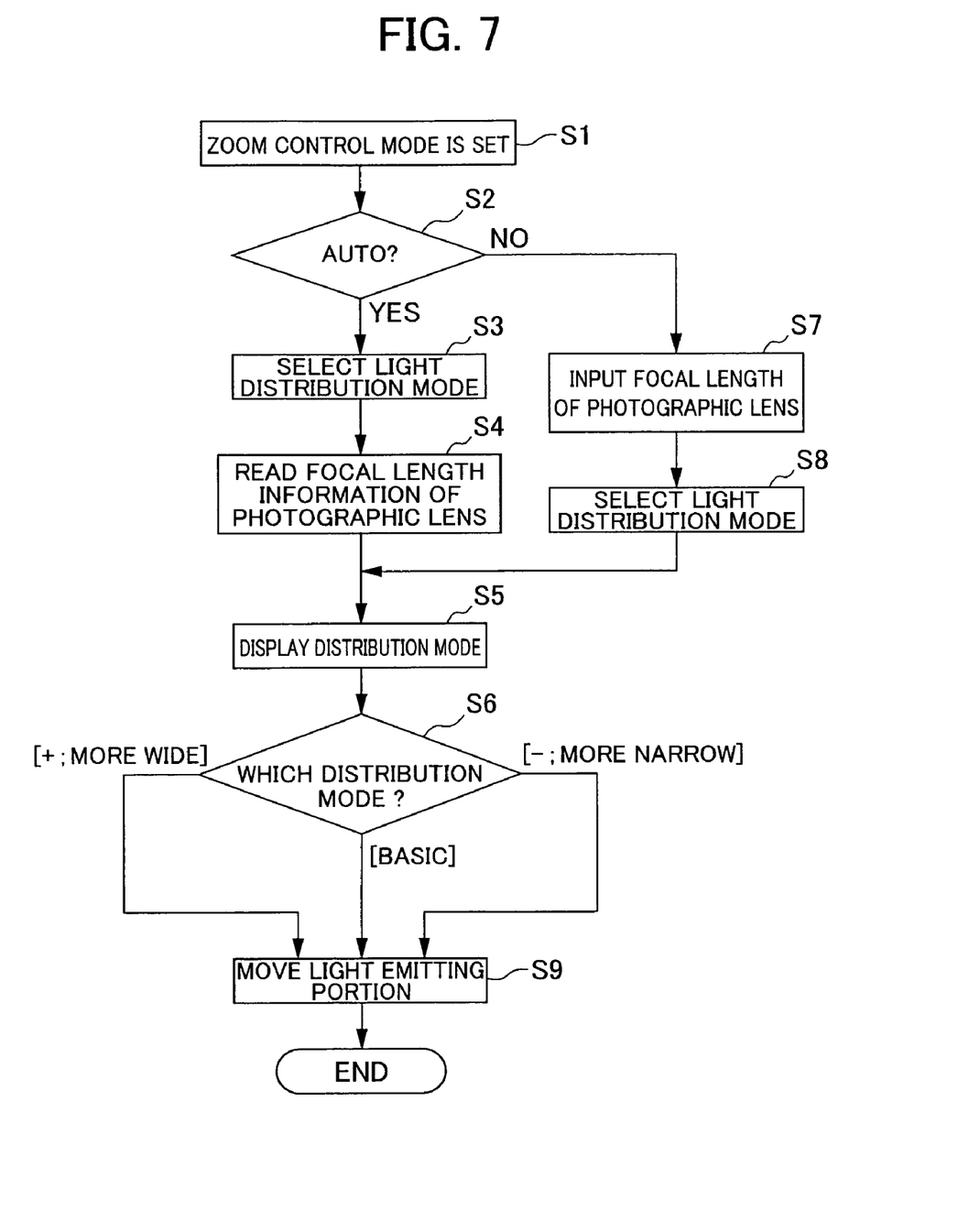
FIG. 7 is a flowchart showing the control of the control section.

FIG. 7 is a flowchart showing the control of the control section 12 in the case that one zoom control mode with a selectable light distribution from among the 3 light distribution field angles provided for each focal length of the photographic lens field angle is selected.

In the menu screen, when a zoom control mode is selected (step 1, and hereafter, "step" is abbreviated as "S"), the control section 12 makes the display portion 24 display a screen for selecting whether to set an Auto Mode which automatically carries out the input of the focal length information of the photographic lens, or to set a Non-Auto Mode where the user inputs this him or herself (S2).

If the user selects the Auto Mode (S2, YES), the control section 12 makes the display portion 24 display a screen for selecting the light distribution mode, and waits for the input of the light distribution mode by the user (S3). As the light distribution mode, there are 3 modes which are the wide light distribution mode in which the light emitting portion 13, as explained above, is moved to the wide light distribution position A+, the basic light distribution mode with the basic light distribution position A0, and the narrow light distribution mode with the narrow light distribution position A−.

When any of the light distribution modes is selected by the operation of the input portion 23 by the user, and the release button (not shown in the figures) of the camera 30 is pressed, the focal length information of the photographic lens 40 is read in by the control section 12 of the flash apparatus 10 (S4).

On the other hand, when the Non-Auto Mode is selected (S2, NO), the control section 12 makes the display portion display a screen for inputting the focal length of the photographic lens 40, and waits for the input of the focal length information by the user (S7). When the focal length information of the photographic lens 40 is manually input by operation of the input portion 23 by the photographer, the control section 12 makes the display portion 24 display a screen for selecting the light distribution mode (S8). The action of S8 is the same as the action of the above-explained S3.

Next, in S5, the light distribution mode selected in S3 or S8 is displayed on the display portion 24 (S5).

Next, the control section 12 judges which of the positions was selected from among the aforementioned wide light distribution position +, the basic light distribution position 0, and the narrow light distribution position −, as the position with respect to the holding stand 15 of the light emitting portion 13 in S3 and S8 (S6).

Next, in S9, in accordance with the judgment of S6, the position of the light emitting portion 13 with respect to the holding stand 15 is moved to the position selected from among the wide light distribution position +, the basic light distribution position 0, and the narrow light distribution position −, using the driving mechanism in the holding stand 15. Along with this, based on the focal length information of the photographic lens obtained in the above described S4 or S7, the position of the holding stand 15 in the Z direction is adjusted (driven) using the linear motion mechanism 16.

For example, in the case that Auto is selected in S2, and the light emitting portion 13 is driven via the route of S3 and S4, and the focal length of the lens is a wide side, for example the focal length of the lens is 24 mm, as shown in FIG. 2, the holding stand 15 is moved to position A with respect to the linear motion mechanism 16. Further, in the case that the wide light distribution is selected, the light emitting portion 13 is moved to the wide light distribution position A+, in the case that the basic light distribution is selected, the light emitting portion 13 is moved to the basic light distribution position A0, and in the case that the narrow light distribution is selected, the light emitting portion 13 is moved to the narrow light distribution position A−.

On the other hand, for the case that the focal length of the lens is moderate, for example, the focal length of the lens is 50 mm, as shown in FIG. 2, the holding stand 15 is moved to position B with respect to the linear motion mechanism 16. Further, in the case that the wide light distribution is selected, the light emitting portion 13 is moved to the wide light distribution position B+, in the case of the basic light distribution 0, the light emitting portion 13 is moved to the basic light distribution position B0, and in the case that the narrow light distribution − is selected, the light emitting portion 13 is moved to the narrow light distribution position B−.

On the other hand, for the case that the focal length of the lens is tele side, for example, the focal length of the lens is 105 mm, as shown in FIG. 2, the holding stand 15 is moved to position C with respect to the linear motion mechanism 16. Further, in the case that the wide light distribution is selected, the light emitting portion 13 is moved to the wide light distribution position C+, in the case that the basic light distribution is selected, the light emitting portion 13 is moved to the basic light distribution position C0, and in the case that the narrow light distribution is selected, the light emitting portion 13 is moved to the narrow light distribution position C−.

From the above, the present embodiment has the following effects.

(1) Along with the light emitting portion 13 being driven in correspondence the focal length information of the photographic lens 40, even within the position corresponding to this focal length, it is possible to select any mode from among the wide light distribution mode, the basic light distribution mode, and the narrow light distribution mode. In the case that the wide light distribution mode is selected, a brightness of −1 EV or above is maintained within the photographic field angle, and it is possible to obtain an image that is bright overall. Further, in the case that the narrow mode is selected, the periphery is darker than the standard, but this is appropriate for the case that only the central portion is desired to be bright. Furthermore, in the case that the narrow light distribution mode is selected, it is possible to realize a higher guide number than for the case of the wide light distribution mode and the basic light distribution mode, and by the lower peripheral light intensity, the appearance is more three dimensional, and this is favorable for cases where the photographed image is desired to be three dimensional, for example portraits and the like.

(2) When the flash apparatus 10 is used, because the light distribution mode is set to the mode set for the previous use, once the photographer has set the light distribution mode in accordance with his or her preference, it is not necessary to set the mode for the next use.

(3) When the wide light distribution position A+ is selected, the display 24a showing that the light distribution field angle is widened is light in the display portion 24, and when the narrow light distribution position A− is selected, the display 24b showing that the light distribution field angle is narrowed is light in the display portion 24. Accordingly, it is possible to confirm the currently selected light distribution mode. Further, for the case of the basic light distribution position A0, it is considered that no particular change in the light distribution mode is necessary. In the present embodiment, in this case, there is no display concerning the light distribution field angle in the display portion 24, thus no unnecessary cautions are raised.

(4) When the Auto Mode is not selected, the position of the light emitting portion 13 can be manually changed to any position, thus ensuring the possibility for a skilled user or the like to change the position of the light emitting portion 13 freely in accordance with his or her preference.

Second Embodiment

Next, the second embodiment of the present invention will be explained. The constitution of the flash apparatus of the second embodiment is similar to that of the first embodiment, thus similar reference numbers to those of the first embodiment are used, and explanations of similar parts are omitted.

The second embodiment and the first embodiment are similar in the point that the position of the holding stand 15 with respect to the linear motion mechanism 16 is determined by the focal length information of the photographic lens 40, as shown by the positions A, B, and C in FIG. 2. Further, they are similar in the point that a wide light distribution mode, a basic light distribution mode, and a narrow light distribution mode are selectable by further moving the light emitting portion 13 on the holding stand 15.

The point of difference between the second embodiment and the first embodiment is the point that any one of the wide light distribution mode, basic light distribution mode, and narrow light distribution mode at the position (for example A, B, and C) of the holding stand 15 moved in accordance with the focal length information is not selected by the photographer, but automatically selected in accordance with the photographed scene.

Here, the photographic scene means the state of the object at the time of the photograph, such as a group photo scene, a portrait scene or the like. This photographic scene is judged by one, or a combination of several kinds of object information, such as the focal length information of the photographic lens; the results of picture analysis of the imaging picture, for example, picture analysis results (face recognition results) such as the number, size and position of faces obtained from the picture analysis (face recognition) from the through image (live view image) before photographing; the return light of the monitor light emission of the flash apparatus (reflected light from the object); the photographic distance information of the photographic lens, and the like.

In the present embodiment, the focal length information, which is one of the judgment bases of the photographic scene, is used for the movement to the positions A, B, or C of the holding stand 15 in FIG. 2 as explained above, called the broad movement of the light emitting portion 13.

Then, the face recognition results, which are other judgment bases of the photographic scene, is used to select any one of the wide light distribution mode, basic light distribution mode, and narrow light distribution mode corresponding to the position of the light emitting portion 13 at each of the positions A, B, and C of the holding stand 15.

Further, the return light (reflected light from the object) of the monitor light emission (preliminary light emission) of the flash apparatus 10 is used to increase the accuracy of the selection of the light distribution mode based on the face recognition result.

Explained more specifically, the position of the holding stand 15 is determined by the focal length information of the photographic lens 40.

For example, if the focal length of the photographic lens 40 is wide side, for example, the focal length of the lens is 24 mm, there is a high likelihood that the photographic scene is a group photograph, an indoor photograph, a landscape photograph, or the like. Accordingly, because it is preferable for the light to irradiate the entire region of the photographic field angle, the holding stand 15 is moved to position A suitable for wide side photography, as shown in FIG. 2.

On the other hand, when the focal length of the lens is intermediate (basic), for example, the focal length of the lens is 50 mm, the holding stand 15 is moved to position B suitable for photography with a normal focal length as shown in FIG. 2.

Further, if the focal length of the photographic lens is telephoto, for example the focal length of the lens is 105 mm, a photographic scene such as a portrait or a close up such that part of the object is trimmed is anticipated. In this case, it is preferable for the light to be illuminated in the center of the picture. As shown in FIG. 2, the holding stand 15 is moved to position C which is suitable for telephoto photography.

Then, the face recognition results which are a basis for judging the photographic scene are each used to select any one of the wide light distribution mode, basic light distribution mode, narrow light distribution mode at each position A, B, or C of the holding stand 15.

Figure 8A:
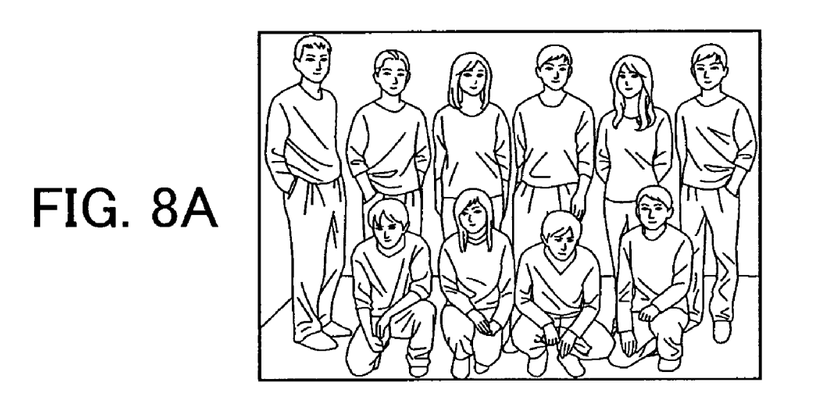
FIG. 8 is a drawing showing an example of a photographic scene.

Herein, face recognition is, as explained above, the recognition by picture analysis of the number, size, position and the like of faces in the picture imaged in the photographic field angle. If the number of faces recognized is large, and the positions of these faces are distributed over the entire picture, then a group photograph such as shown for example in FIG. 8A is assumed. Because in such a scene it is preferable for the light to be irradiated over the entire region of the photographic field angle, the wide light distribution mode is selected as the light distribution mode (for example, A+ in FIG. 2).

Figure 8B:
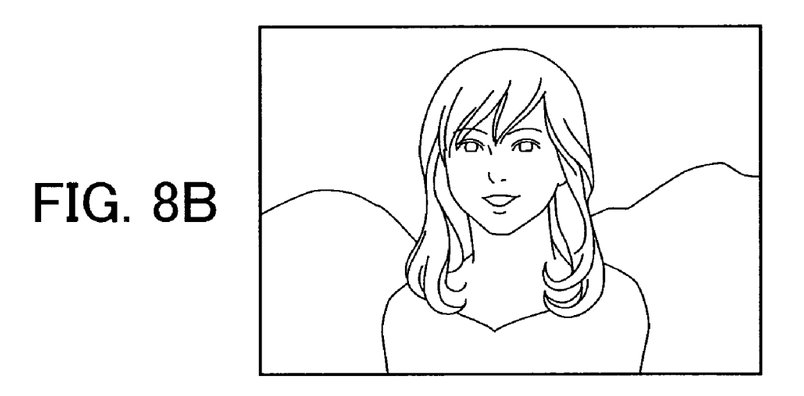

Further, if the number of recognized faces is 1 or 2, and they are positioned in the center of the picture, then a portrait photograph such as shown in FIG. 8B is assumed. In this case, because it is preferable for the light to be illuminated in the center of the picture, the narrow light distribution mode is selected as the light distribution mode (for example, A− in FIG. 2).

Furthermore, it is possible to infer the photographic scene not from the number and position of the faces in the face recognition, but by the size of the faces, and the light distribution mode can also be selected according to the result of this inference.

Furthermore, the return light of the monitor light emission of the flash apparatus can be used to improve the accuracy of the light distribution mode selected by the face recognition result.

For example, when the picture is divided into any number of divisions, and there is a return intensity, without exception, then it can be surmised that the background of the four corners is close. In this case, because it is preferable for the light to irradiate the entire region of the photographic field angle, the wide light distribution mode is preferable as the light distribution mode (for example, A+ in FIG. 2).

On the other hand, if the return intensity from the object of the monitor light emission is concentrated in the center portion, then it can be judged that the four corners are empty. In this case, because it is preferable to collect the light in the center of the picture, the narrow light distribution mode is preferable as the light distribution mode (for example, A− in FIG. 2).

In the present embodiment, the monitor light emission return light is suitably used as a supplement to the face recognition result.

For example, in the case shown in FIG. 8B, it is judged by the face recognition system that there is one face, and is inferred to be a photograph of a person with the main object positioned in the center. Then, in the case of FIG. 8B, the return light intensity from the four corners by the monitor light emission is low because the background object is at a very far location, and the inference that the main object is positioned at the center becomes more certain. In this case, the information from the return light of the monitor light emission and the face recognition result agree, and the narrow light distribution mode which carries out light distribution with emphasis on the central portion is selected. In this way, a larger guide number can be obtained.

Further, even in the case that the face recognition system judges one face in the picture is in the center of the picture, and it is inferred to be a photograph of a person with the main object positioned in the center, in the case that the return light of the monitor light emission arrives without exception as mentioned above, it can be considered that the background object is close in terms of distance to the person in the center. In this case, the wide light distribution mode which irradiates light over the entire region of the photographic field angle can be selected (for example, A+ in FIG. 2).

Figure 8C:
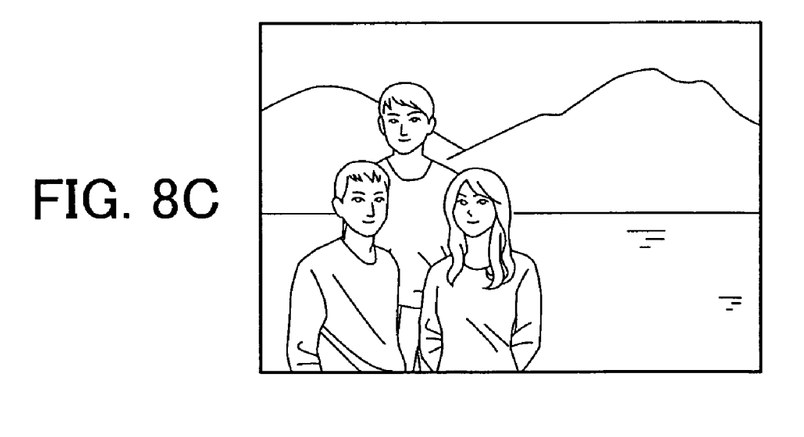

On the other hand, as shown in FIG. 8C, if there are many faces at the edge of the picture, or if they are only at the edge, it is inferred that the main object is not present in the center portion. In such a case, the face recognition system judges that multiple faces are present at the side (edge), and it is judged that the wide light distribution mode is preferable, but in the case of FIG. 8C, there is the possibility that the narrow light distribution mode will be judged preferable because there is little return light intensity from the four corners by the monitor light emission. In this case, in the present embodiment, the face recognition is prioritized, it is inferred that the main object is at the edge, and regardless of the focal length of the photographic lens, the wide light distribution mode which carries out uniform light distribution is selected.

In this way, in the present embodiment, appropriate reference is made to the results of the return light of the monitor light emission, but without being limited to this, it is also possible to prioritize the information of the return light of the monitor light emission, and further, it is also possible to allow the photographer to freely select which of the face recognition results and the information of the return light of the monitor light emission to prioritize.

Figure 9:
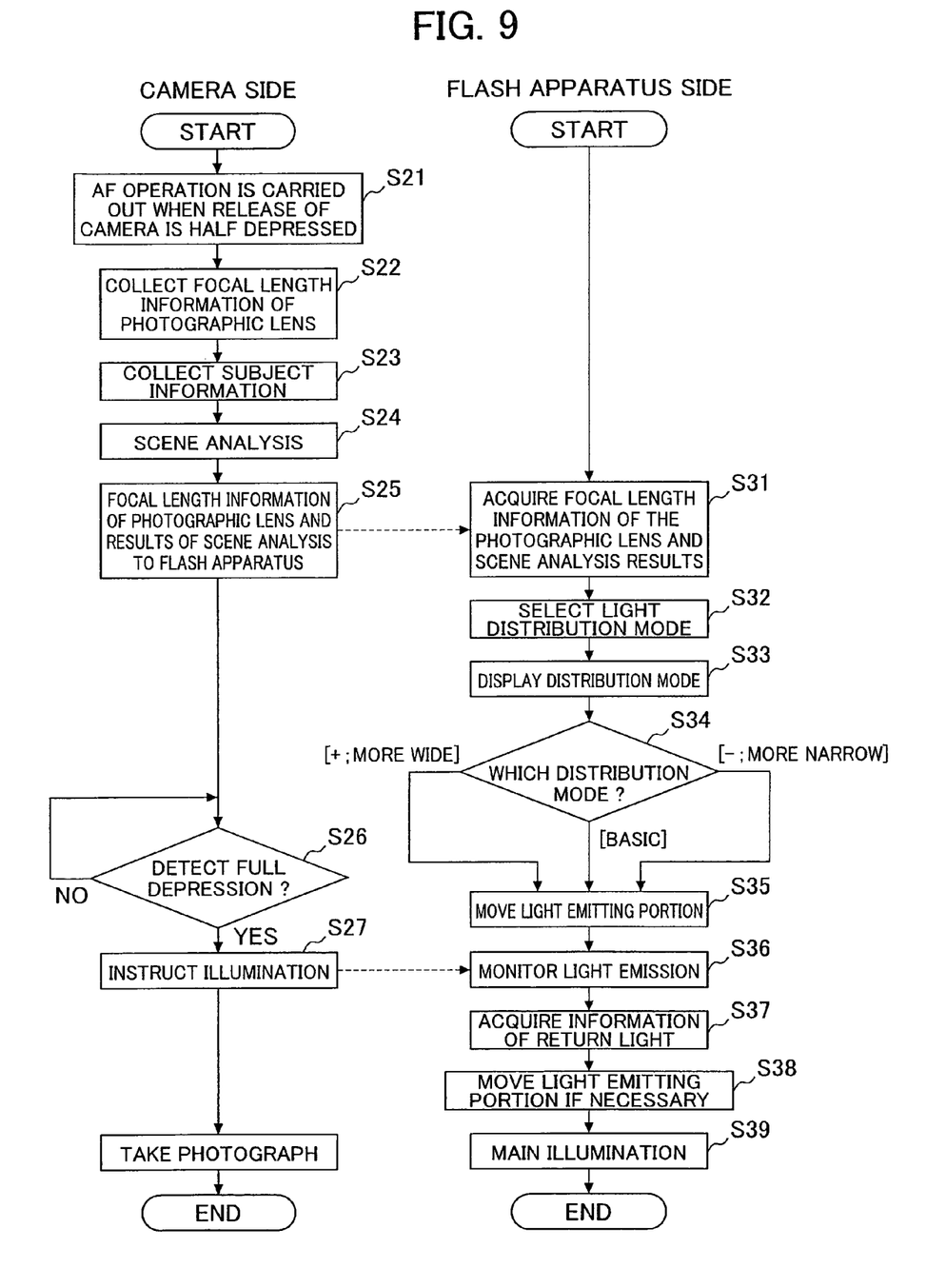
FIG. 9 is a flowchart showing the control of the second embodiment.

Next, the control of the camera control section 31 and the control section 12 of the flash apparatus 10 of the second embodiment will be explained. FIG. 9 is a flowchart showing the control of the camera control section 31 and the control section 12 of the flash apparatus 10.

First, when the release button (not shown in the drawings) of the camera 30 is half depressed, coupled with this half depression, the camera control section 31 drives the photographic lens 40, and the AF (autofocus) operation is carried out (S21).

The camera control section 31, in addition to collecting the focal length information of the photographic lens 40 (S22), also collects object information within the photographic field angle (S23).

The camera control section 31, based on the collected object information, analyzes which kind of scene the object picture is (S24).

After the analysis, the camera control section 31 transmits the focal length information of the photographic lens 40 and the results of the scene analysis to the flash apparatus 10 (S25).

The control section 12 of the flash apparatus 10 acquires the focal length information of the photographic lens 40 and the scene analysis results (S31).

The control section 12, based on the acquired scene analysis results, selects any light distribution mode (wide light distribution mode/basic light distribution mode/narrow light distribution mode) (S32).

The control section 12 then displays the light distribution mode on the display portion 24 (S33).

Next, the control section 12 judges which is the light distribution mode (S34), drives the holding stand 15 based on the focal length information, and further moves the position of the light emitting portion 13 on the holding stand 15 to a position corresponding to the selected light distribution mode from among the wide light distribution position +, the basic light distribution position 0, and the narrow light distribution position − (S35).

The camera control section 31, upon detecting a full depression of the release button (S26), sends out an illumination instruction to the flash apparatus 10 (S27).

The control section 12 of the flash apparatus 10 executes a monitor light emission on receiving the illumination instruction from the camera control section 31.

The control section 12, when executing the monitor light emission, acquires the information of the return light from the object (S37).

Based on this information of the return light, the position of the light emitting portion 13 (a position corresponding to any of the wide light distribution/basic light distribution/narrow light distribution) is adjusted if necessary (S38).

Next, the flash apparatus 10 carries out the main illumination, and the photographing is finished.

In accordance with the above, the present embodiment has the following effects.

(1) Along with driving the light emitting portion 13 (holding stand 15) in accordance with the focal length information of the photographic lens 40, within the position corresponding to this focal length, any mode from among the wide light distribution mode, basic light distribution mode, and narrow light distribution mode is further selected in accordance with the photographic scene. Because of this, it is possible to ensure an appropriate light distribution quality in accordance with the photographic scene. Further, the selection of the light distribution mode in accordance with this photographic scene is automatically carried out, thus, an appropriate light distribution quality in accordance with this scene can be easily ensured.

(2) The focal length of the photographic lens is joined by the face recognition information and the object information from the monitor light emission, thus it is possible to provide a more optimal light distribution mode.

Modifications

The present invention is not limited to the above explained embodiments, and as shown below many modifications and alterations are possible, and these also fall within the scope of the present invention.

(1) When the flash apparatus 10 is attached to the camera 30, it is also possible to automatically select the light distribution mode according to the type of camera. In this case, for example, for a film camera, the basic light distribution position 0 is automatically selected, while for a digital camera, the imaging sensor has a narrower latitude compared to film, and the wide position + is automatically selected. As a method for realizing this, when the flash apparatus 10 is attached to the camera body 30, via each other's terminals, the control section 12 of the flash apparatus obtains the camera category information (whether it is a film camera or a digital camera) from the camera 30, and further the control section 12, based on this category information, may automatically select and set the light distribution mode as explained above.

(2) If the camera can be set to one of multiple photographic modes, then the light distribution mode can be automatically selected according to the setting of this photographic mode. For example, if a sports photographic mode which is suitable for sports photography is selected, an object which moves very actively can easily move to the edge of the photographic field angle, thus the wide position + is selected, and when a distant view mode appropriate for photographing objects which have a comparatively distant position, such as scenery or the like, it is possible that the guide number will be insufficient, thus the narrow position − is selected. As a method of realizing this, when the photographic mode is set on the camera side, this photographic mode information is sent from the camera to the control section 12 of the flash apparatus via each other's terminals, and further, the control section 12 may automatically select and set the light distribution mode as explained above based on this information.

(3) If the camera can be set to one of multiple photometric modes, it is possible to automatically select a light distribution mode in accordance with this photometric mode. For example, if the spot photometric mode is selected, there is a high likelihood that the extent of the object is narrow, thus the narrow light distribution position is automatically selected; if multi-pattern photometric is selected, there is a high likelihood that the extent of the object is wide, thus the wide light distribution position is automatically selected; and if the center weighted photometric is selected, the extent of the object is in between, thus the basic light distribution mode is automatically selected as the light distribution mode.

(4) If the camera can be set to one of multiple distance measuring modes, it is possible to automatically select the light distribution mode according to this distance measuring mode. For example, if the pinpoint AF mode is selected, there is a high likelihood that the range of movement of the object is small, thus the narrow light distribution position is selected; if a wide area is selected in the area AF, there is a high likelihood that the range of movement of the object is large, thus the wide light distribution position is selected, and if the center weighted photometric is selected and a moderate area is selected in the area AF, it is inferred that the range of the object is intermediate thus the basic light distribution position is selected. As a method of realizing this, in a method such as the above explained (1) and (2), the control section 12 which has input the distance measuring mode from the camera side may automatically select and set the light distribution mode as above according to this information.

(5) In the above embodiments, configurations where one of three light distribution modes is chosen were explained. However, the present invention is not limited to this, and the selectable light distribution modes can be two, or four or more. For example, not only the light distribution modes such as those explained in FIGS. 5A to 5C, but also a light distribution mode such as that shown in FIG. 5D can be provided.

(6) It can also arranged to make it possible to observe how the photograph will turn out after photographing with the selected light distribution, before the photograph is taken. Because some time is necessary for the charging of the flash apparatus, if it were arranged to make it possible to check in advance, for example in the finder, the photographed state, it would then be possible to make the photograph with a suitable light distribution without taking multiple photographs, and only one charge would be necessary, thus it would be possible to shorten the photographing time, and prevent the wasteful consumption of electric power. In order to realize this, when displaying a through image on for example a display portion displaying a through image (display portion on the camera side), the brightness of the peripheral region in the picture can be changed according to the switching of the light distribution mode using a publicly known method (for example, the method of changing the transmittance according to the display region, and changing the luminance of the display pixels, as disclosed in Japanese Unexamined Patent Publication No. Hei 10-333235). In this case, specifically, display control is carried out so that, if the light distribution mode is the basic light distribution position, the through image is displayed as-is on the display portion, and if it is the wide light distribution position, the through image display is carried out with the display luminosity of the four corner region in the screen increased compared to the through picture display for the case of the basic light distribution position and if it is the narrow light distribution position, the through image is displayed with the display luminosity of the perimeter region in the screen darkened compared to the through image display for the case of the basic light distribution position.

Figure 10:
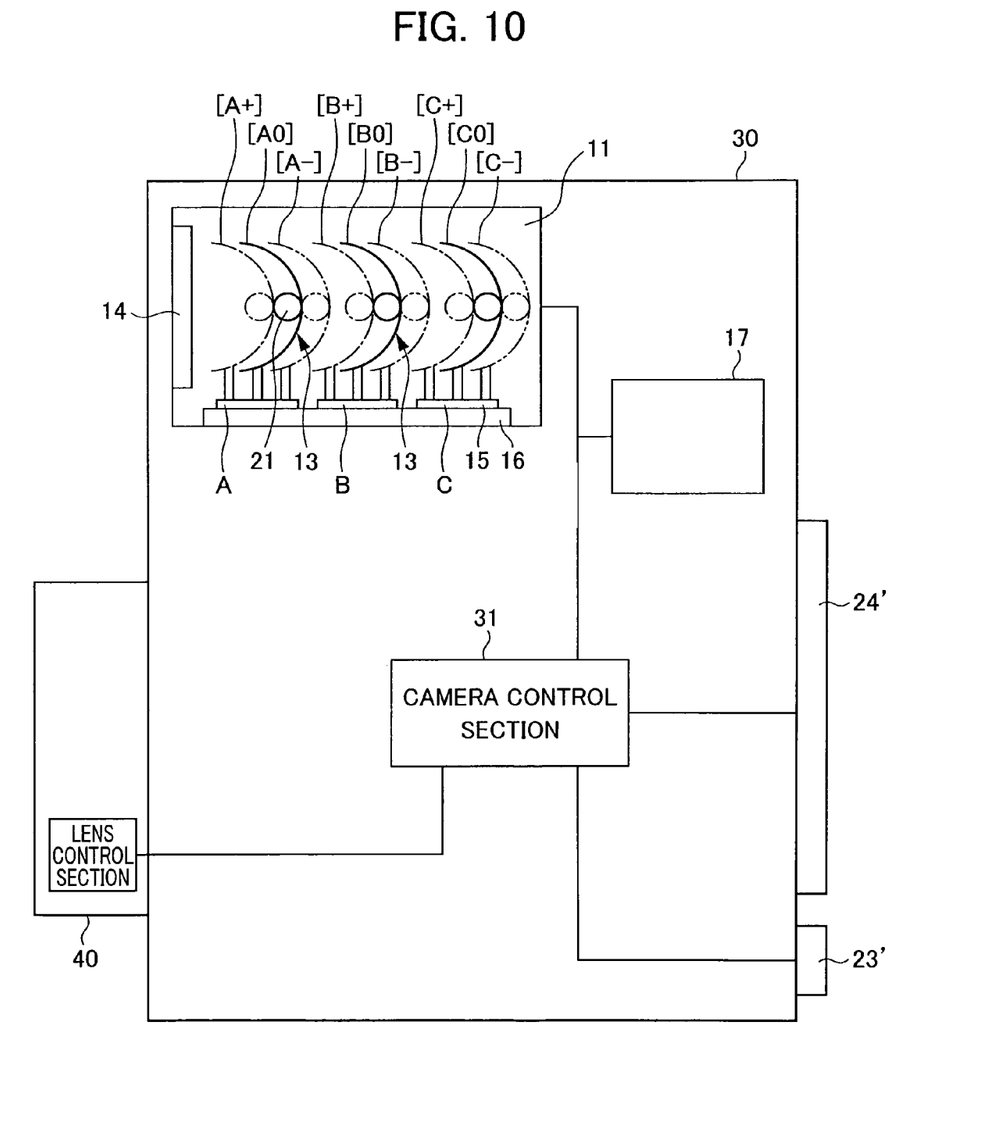
FIG. 10 is a block diagram of a camera with a built-in flash apparatus of the embodiment.

(7) An electronic flash apparatus as explained above can also be built into a camera. FIG. 10 is a block diagram of a camera with the above explained electronic flash apparatus built in, which is an interchangeable lens type camera. The point of difference with the camera shown in FIG. 2 is the point that, in FIG. 2, there is a control section 12 of the flash apparatus side, but in the camera of FIG. 10, this is absent, and instead, all of the control operations which were carried out by the control section 12 are carried out by the camera control section 31, and the point that the display portion 24' provided at the back of the camera displays not only the setting display of the camera side and the through picture display, but also carries out the display that was carried out by the display portion 24 of FIG. 2, and the point that the input portion 23' provides not only the function for the information input of the camera side, but also provides input functions which were carried out by the input portion 23 of FIG. 2. Moreover, the lens information (focal length information) is input from the lens control section, but it is also possible for the camera to be one incorporating a lens, and in this case, there is no need to receive the lens information.

What is claimed is:

1. An electronic flash apparatus comprising:
   a first adjustment unit configured to adjust a light distribution field angle according to a focal length of a photographic lens and a photographic region on an imaging device; and
   a second adjustment unit configured to select one of a plurality of light distribution field angles that correspond to a particular focal length, separately from the first adjustment unit.

2. The electronic flash apparatus according to claim 1, wherein when one photographic mode among a plurality of photographic modes provided on a camera is selected, the second adjustment unit automatically selects one light distribution field angle from among the plurality of light distribution field angles according to the selected photographic mode.

3. The electronic flash apparatus according to claim 1, wherein when one photometric mode among a plurality of photometric modes provided on a camera is selected, the second adjustment unit automatically selects one light distribution field angle from among the plurality of light distribution field angles according to the selected photometric mode.

4. The electronic flash apparatus according to claim 1, wherein when one distance measuring mode among a plurality of distance measuring modes provided on a camera is selected, the second adjustment unit automatically selects one light distribution field angle from among the plurality of light distribution field angles according to the selected distance measuring mode.

5. The electronic flash apparatus according to claim 1, wherein the second adjustment unit automatically selects one light distribution field angle from among the plurality of light distribution field angles according to conditions of an area inside the field angle which an object occupies.

6. The electronic flash apparatus according to claim 1, wherein:
   the selection of the light intensity distribution is automatically carried out according to a photographic scene photographed by the camera.

7. The electronic flash apparatus according to claim 6, wherein:
   the selection of the light intensity distribution is carried out based on face recognition which detects a human face in an object image in the photographic scene.

8. The electronic flash apparatus according to claim 7, wherein:
   the face recognition comprises recognition of a position, number and size of the face of the object, and the selection of the light distribution field angle is based on at least one of these.

9. The electronic flash apparatus according to claim 1, wherein:
   a selection of the light distribution field angle is made with reference to a state of reflected light of a preliminary illumination carried out for an object in a photographic scene.

10. The electronic flash apparatus according to claim 1, wherein:

the light distribution field angle is one light distribution field angle automatically selected from among the plurality of light distribution field angles in accordance with a type of camera on which the electronic flash apparatus is mounted.

11. The electronic flash apparatus according to claim 1, wherein:

the light distribution field angle is one light distribution field angle selectable from among three or more light distribution field angles.

12. The electronic flash apparatus according to claim 1, wherein:

a display portion distinguishably displaying a selected light distribution state is provided.

13. An electronic flash apparatus comprising:

a flash apparatus main body;

a light emitting body which emits a flash;

a first driving mechanism which moves the light emitting body in an optical axis direction of the flash inside the flash apparatus main body according to a focal length of a photographic lens and a photographic range on an imaging device; and a second driving mechanism which moves the light emitting body to one of a plurality of positions that correspond to a particular focal length, separately from the first driving mechanism moving the light emitting body.

14. A camera provided with the electronic flash apparatus according to claim 1.

* * * * *